United States Patent
Huberman et al.

(10) Patent No.: US 10,165,543 B1
(45) Date of Patent: Dec. 25, 2018

(54) METHOD AND SYSTEM FOR MOBILE DEVICE LOCALIZATION IN EXTREME AMBIENT CONDITIONS

(71) Applicant: MAPSTED CORP., Mississauga (CA)

(72) Inventors: Sean Huberman, Guelph (CA); Joshua Karon, Toronto (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 16/101,826

(22) Filed: Aug. 13, 2018

(51) Int. Cl.
- *H04W 64/00* (2009.01)
- *G01C 21/20* (2006.01)
- *G01C 5/06* (2006.01)

(52) U.S. Cl.
CPC ............ *H04W 64/003* (2013.01); *G01C 5/06* (2013.01); *G01C 21/206* (2013.01)

(58) Field of Classification Search
CPC ....... H04W 4/025; H04W 4/043; H04W 4/33; H04W 64/00; H04W 64/003; G01C 5/06; G01C 21/165; G01C 21/20; G01C 21/206
USPC ......... 455/404.1, 404.2, 456.1, 456.2, 456.3, 455/456.6, 457
See application file for complete search history.

(56) References Cited

U.S. PATENT DOCUMENTS

| | | | |
|---|---|---|---|
| 2009/0043504 A1 | 2/2009 | Bandyopadhyay et al. | |
| 2010/0318293 A1* | 12/2010 | Brush | G01C 21/165 701/431 |
| 2011/0078089 A1* | 3/2011 | Hamm | G06Q 10/0833 705/333 |
| 2014/0141796 A1* | 5/2014 | Marti | G01S 5/0252 455/456.1 |
| 2014/0171068 A1* | 6/2014 | Marti | G01S 1/047 455/427 |
| 2016/0157165 A1* | 6/2016 | Xie | H04W 36/0083 455/434 |
| 2016/0379074 A1 | 12/2016 | Nielsen et al. | |
| 2017/0225921 A1* | 8/2017 | Scoville | B66B 1/3492 |
| 2017/0280301 A1* | 9/2017 | Chang | H04W 4/043 |

* cited by examiner

*Primary Examiner* — Quoc Thai N Vu
(74) *Attorney, Agent, or Firm* — Henry L. Ohab

(57) ABSTRACT

A method and system for localizing a mobile device in extreme ambient conditions. The method, executed in a processor of the mobile device, comprises detecting, using a temperature sensor of the mobile device at a first sampling rate, an ambient temperature anomaly along an indoor route being traversed, determining, based on switching to a second sampling rate, that the ambient temperature anomaly persists over a sequence of positions along the indoor route, filtering a set of barometric ambient pressure measurements contemporaneously associated with the sequence of positions, the set obtained using a barometric pressure sensor of the mobile device, and localizing the mobile device based at least partly on the filtered set of barometric ambient pressure measurements.

20 Claims, 4 Drawing Sheets

400

Detecting, using a temperature sensor of the mobile device at a first sampling rate, an ambient temperature anomaly along an indoor route being traversed 410

Determining, based on switching to a second sampling rate, that the ambient temperature anomaly persists over a sequence of positions along the indoor route 420

Filtering a set of barometric ambient pressure measurements contemporaneously associated with the sequence of positions, the set obtained using a barometric pressure sensor of the mobile device 430

Localizing the mobile device based at least partly on the filtered set of barometric ambient pressure measurements 440

FIG. 4

METHOD AND SYSTEM FOR MOBILE DEVICE LOCALIZATION IN EXTREME AMBIENT CONDITIONS

TECHNICAL FIELD

The disclosure herein relates to the field of mobile device navigation and positioning.

BACKGROUND

Users of mobile devices are increasingly using and depending upon indoor positioning and navigation applications and features. Seamless, accurate and dependable indoor positioning of a mobile device as carried or worn by a user can be difficult to achieve using satellite-based navigation systems when the latter becomes unavailable, or sporadically available, and therefore unreliable, such as within enclosed or partially enclosed urban infrastructure and buildings, including hospitals, shopping malls, airports, universities and industrial warehouses. Barometric ambient measurements, in addition to wireless signal and inertial measurements, may be used to localize a mobile device within a multi-floor build being traversed. Barometric pressure data, however, may be subject to spurious, and therefore undependable, correlations with height or altitude under certain extreme ambient conditions.

BRIEF DESCRIPTION OF THE DRAWINGS

FIG. 4 illustrates, in an example embodiment, a method of localizing a mobile device based on extreme ambient temperature conditions.

DETAILED DESCRIPTION

Figure 1:
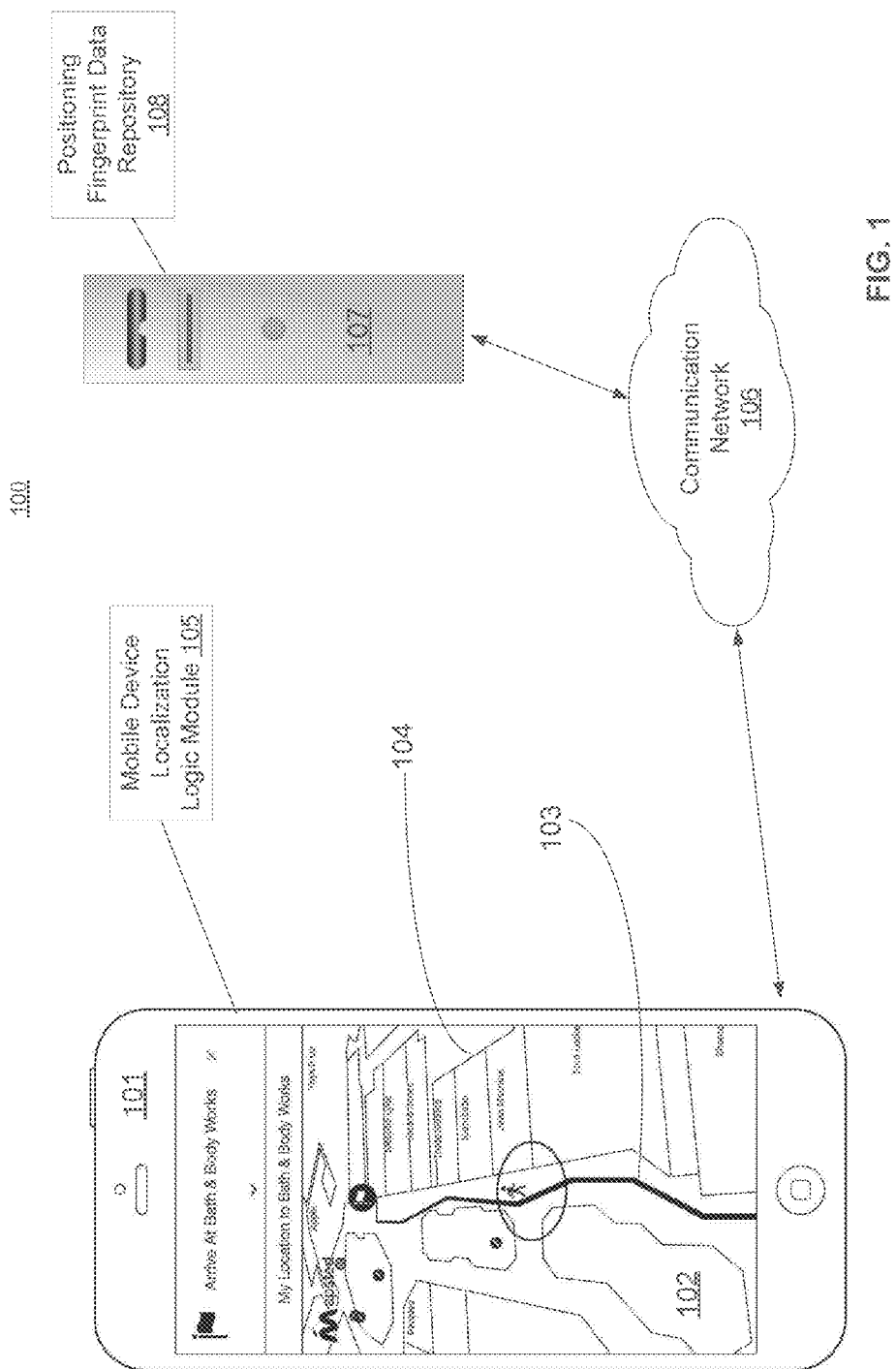
FIG. 1 illustrates, in an example embodiment, a system for localizing a mobile device.

Embodiments herein provide for localizing a position of a mobile device at least in part based on ambient barometric pressure measurements. The inventors herein recognize that barometric pressure data, however, may be subject to spurious and undependable correlations with height and building floor number under certain extreme ambient temperature conditions. Among other benefits and technical effects, it is recognized that such spurious barometric ambient pressure data may be filtered in order to maintain integrity of floor identification as localized for a carried mobile device in extreme temperature conditions, such as for firefighters or similar rescue personnel.

Provided is a method for localizing a mobile device in extreme ambient conditions. The method, executed in a processor of the mobile device, comprises detecting, using a temperature sensor of the mobile device at a first sampling rate, an ambient temperature anomaly along an indoor route being traversed, determining, based on switching to a second sampling rate, that the ambient temperature anomaly persists over a sequence of positions along the indoor route, filtering a set of barometric ambient pressure measurements contemporaneously associated with the sequence of positions, the set obtained using a barometric pressure sensor of the mobile device, and localizing the mobile device based at least partly on the filtered set of barometric ambient pressure measurements.

Also provided is a mobile device including a processor and a memory storing a set of computer instructions. The instructions are executable in the processor to detect, using a temperature sensor of the mobile device at a first sampling rate, an ambient temperature anomaly along an indoor route being traversed, determine, based on switching to a second sampling rate, that the ambient temperature anomaly persists over a sequence of positions along the indoor route, filter a set of barometric ambient pressure measurements contemporaneously associated with the sequence of positions, the set obtained using a barometric pressure sensor of the mobile device, and localize the mobile device based at least partly on the filtered set of barometric ambient pressure measurements.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, mobile device localization system 100 including mobile device 101. Mobile device 101 may be such as a wearable computing and communication device, a cellular or smartphone, a laptop or a tablet computer that is operational for any one or more of telephony, messaging, and data computing. Mobile device 101 may be connected within communication network system 106, including the internet or other wide area network, to one or more remote server computing devices 107. Mobile device 101 may include mobile device localization logic module 105, the latter embodied according to computer processor-executable instructions stored within a memory of, or otherwise accessible to a processor of, mobile device 101. In alternate embodiments, it is contemplated that one or more portions of mobile device localization logic module 105 may be stored at remote server computing device 107 and made communicatively accessible to mobile device 101 via communication network 106.

A navigation, or positioning, software application downloaded and installed, or stored, in a memory of mobile device 101 may render physical layout map 102 related to a facility or building, including a multi-floor building or indoor facility, within a user interface display of mobile device 101. In one embodiment, the navigation software application may incorporate mobile device localization logic module 105. The terms indoor facility or building as used herein means an at least partially enclosed building having at least one fixed boundary, such as an exterior boundary wall. Display of physical layout map 102 may further show trajectory or route 103 traversed by the mobile device, which may include an estimated trajectory segment predicted for traversal by mobile device 101 within a multi-floor building or facility. Physical layout map 102 may further depict one or more map constraint features 104, such as an internal wall or other map constraint feature including a doorway, a facility exit, a physical marker fixed in place, a facility entrance, a stairwell, a stairway, a corridor, an elevator, and an external boundary outline of the multi-floor indoor facility.

Positioning fingerprint data repository 108 may be communicatively accessible to mobile device 101, for instance via communication network 106. In alternate embodiments, positioning fingerprint data repository 108, or any portion(s) thereof, may be stored in a memory of mobile device 101. The terms fingerprint and fingerprint data as used herein refer to time-correlated, individual measurements of any of, or any combination of, received wireless communication signal strength and signal connectivity parameters, magnetic field parameters or barometric pressure parameters, and mobile device inertial sensor data at known, particular locations along a route being traversed, or anticipated for traversal, by the mobile device. In other words, a fingerprint includes a correlation of sensor and signal information (including, but not necessarily limited to wireless signal strength, magnetic or barometric information, inertial sensor information) associated for a unique location relative to the facility. Thus, fingerprint data associated with a particular location or position provides a signature that uniquely correlates to that particular location or position. Once a particular fingerprint or signature based on any of received wireless communication signal strength and signal connectivity parameters, magnetic field parameters or barometric pressure parameters, and mobile device inertial sensor data is detected or recorded by mobile device 101, the fingerprint as detected may be matched to a reference fingerprint stored in a fingerprint map of a given facility, for example as stored in positioning fingerprint data repository 108, to identify the unique position of the mobile device relative to the facility, a process also referred to herein as localization. A sequence of positions or locations that constitute a navigation path traversed by the mobile device relative to the indoor facility may be mapped for fingerprint data during a fingerprint calibration process. In some embodiments, given that sampling times and sampling rates applied in conjunction with particular mobile device sensors may be different, the signal and sensor information as measured during a fingerprint calibration process may be time-averaged across particular periods of time, with the time-averaged value being used to represent the signal information at any given instance of time within that particular period of time in which the signal information is time-averaged. Fingerprint data may be used to track mobile device 101 traversal along route 103 within, and even adjoining, the indoor facility.

Figure 2:
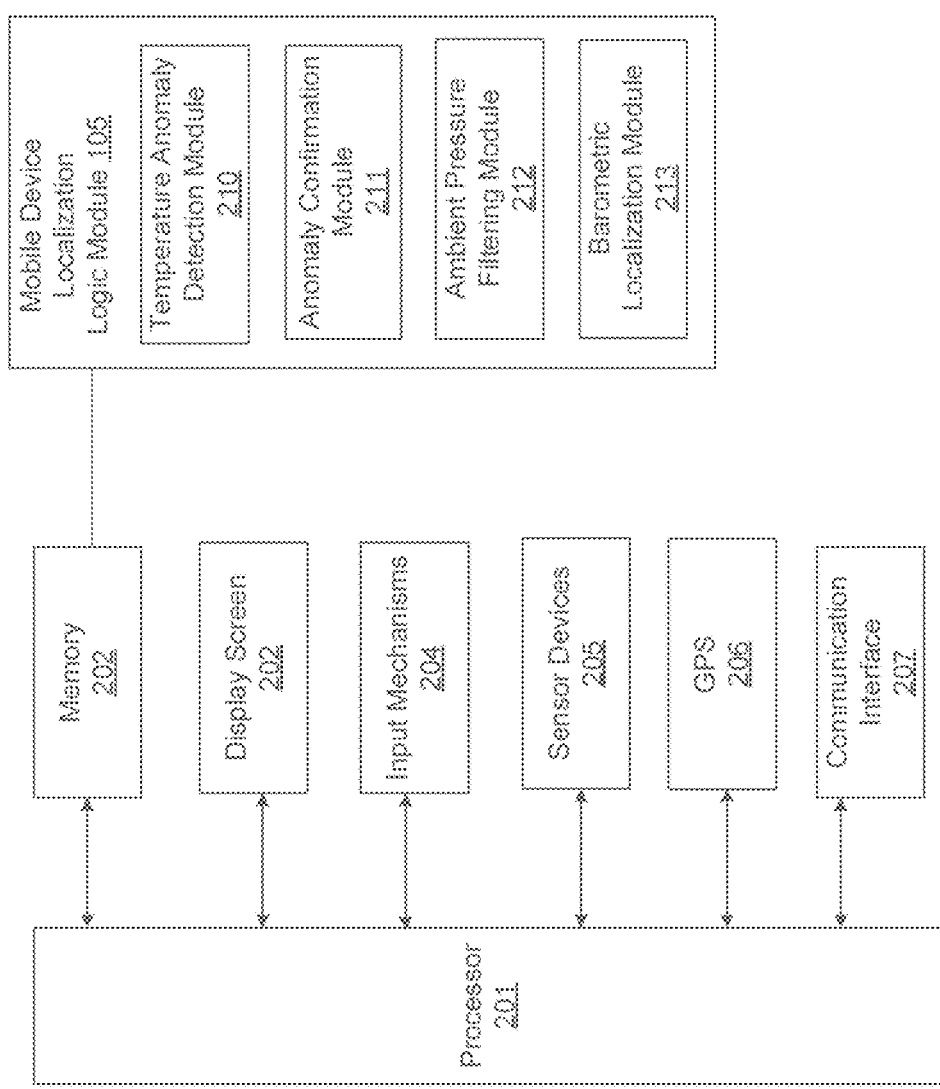
FIG. 2 illustrates, in one example embodiment, an architecture of a mobile device including localization capability for extreme ambient conditions.

FIG. 2 illustrates, in one example embodiment, an architecture of mobile device 101 including localization capability for extreme ambient conditions. Mobile device 101 may include processor 201, memory 202, display screen 203, input mechanisms 204 such as a keyboard or software-implemented touchscreen input functionality, barcode, QR code or other symbol- or code-scanner input functionality. Mobile device 101 may include sensor functionality by way of sensor devices 205. Sensor devices 205 may include inertial sensors such as an accelerometer and a gyroscope, and magnetometer or other magnetic field sensing functionality, barometric or other ambient pressure sensors and sensing functionality, ambient temperature sensors and temperature sensing functionality, ambient gas sensors and ambient lighting sensors. Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 101 further includes the capability for detecting, via sensor devices 205, and measuring a received signal strength, and of determining signal connectivity parameters, related to the ambient wireless signals. In particular, mobile device 101 may include location determination capability such as by way of GPS module 206 having a GPS receiver, and communication interface 207 for communicatively coupling to communication network 106, including by sending and receiving cellular data over data and voice channels.

Mobile device localization logic module 105 includes instructions stored in memory 202 of mobile device 101. In embodiments, mobile device localization logic module 105 may be included in a mobile device navigation application program stored in memory 202 of mobile device 101. The term indoor location as used herein refers to a location within the facility or building, such as within a shopping mall, an airport, a warehouse, a university campus, or any at least partially enclosed building. Mobile device localization logic module 105 may comprise sub-modules including temperature anomaly detection module 210, anomaly confirmation module 211, ambient pressure filtering module 212 and barometric localization module 213.

Processor 201 uses executable instructions stored in temperature anomaly detection module 210 to detect, using a temperature sensor of mobile device 101 operated at a first sampling rate, an ambient temperature anomaly along indoor route 103 being traversed, such as resulting from a building from a fire or high-temperature flames. In embodiments, mobile device 101 barometric pressure data may include a set of barometric pressure measurements using one or more barometric pressure sensors of mobile device 101 while traversing a sequence of positions along route 103. Route 103 being traversed may be such as a hallway, a corridor, a pedestrian path, a set of stairs or a route commencing from an entrance of a multi-floor facility.

Processor 201 executes instructions included in anomaly confirmation module 211 to determine, based on switching to a second sampling rate, that the ambient temperature anomaly persists over a sequence of positions along route 103 being traversed. In one embodiment, the ambient temperature sampling rate of temperature sensors of mobile device 101 may be switched to operate at a higher frequency in order to confirm, with better certainty, the persistence of high-temperature flames within a building, for instance.

Processor 201 uses executable instructions stored in ambient pressure filtering module 212 to filter a set of barometric ambient pressure measurements contemporaneously associated with the sequence of positions along route 103 during traversal, by mobile device 101, the set of barometric ambient pressure measurements obtained using a barometric pressure sensor of the mobile device 101. In one embodiment, where the temperature anomaly that includes a temperature spike exists over a given duration of time, a corresponding or contemporaneous barometric pressure anomaly over same duration that includes a barometric ambient pressure spike may be identified. Barometric ambient pressure measurements of mobile device 101 may filter the barometric ambient pressure anomaly. A threshold temperature may be predetermined to define when an extreme condition temperature anomaly exists. For example, when the ambient temperature increases at a rate higher than 3-10 degrees Celsius per minute, in one embodiment.

In one embodiment, the filtering constitutes disregarding ambient barometric pressure changes as sensed by mobile device 101 for the given duration of time, as the latter may falsely indicate a height change or floor change of mobile device 101 when in fact no such change occurred, but rather, the spike in ambient pressure as measured by mobile device 101 resulting from presence and persistence of high-temperature flames or similar extreme ambient temperature anomaly. In this manner of identifying a given temperature anomaly along with its respective duration, barometric ambient pressure measurements contemporaneous with that same duration are identified as spurious, disregarded, and therefore not taken into account in localizing mobile device 101 to a particular floor of a multi-floor building. In one embodiment, the filtering at least partially discards pressure measurements contemporaneous with a duration of the temperature anomaly that exceeds a predetermined threshold temperature for at least a portion of the sequence of positions. In yet another variation, the method may include algorithmically smoothing the filtered set of barometric ambient pressure measurements, minimizing the effects of noise in the barometric pressure measurements, prior to localizing mobile device 101.

Processor 201 uses executable instructions stored in barometric localization module 213 to localize mobile device 101 based at least partly on matching the filtered set of barometric ambient pressure measurements with barometric fingerprint data of repository 108 along route 103. In embodiments, the fingerprint map data stored in fingerprint data repository 108 (also referred to herein as repository 108) further associates unique positions along route 103 with any combination of fingerprint data, including gyroscope data, magnetic data, accelerometer data, wireless signal strength data, wireless connectivity data, barometric data, acoustic data, line-of sight data, and ambient lighting data, in addition to barometric pressure fingerprint data stored thereon.

Figure 3:
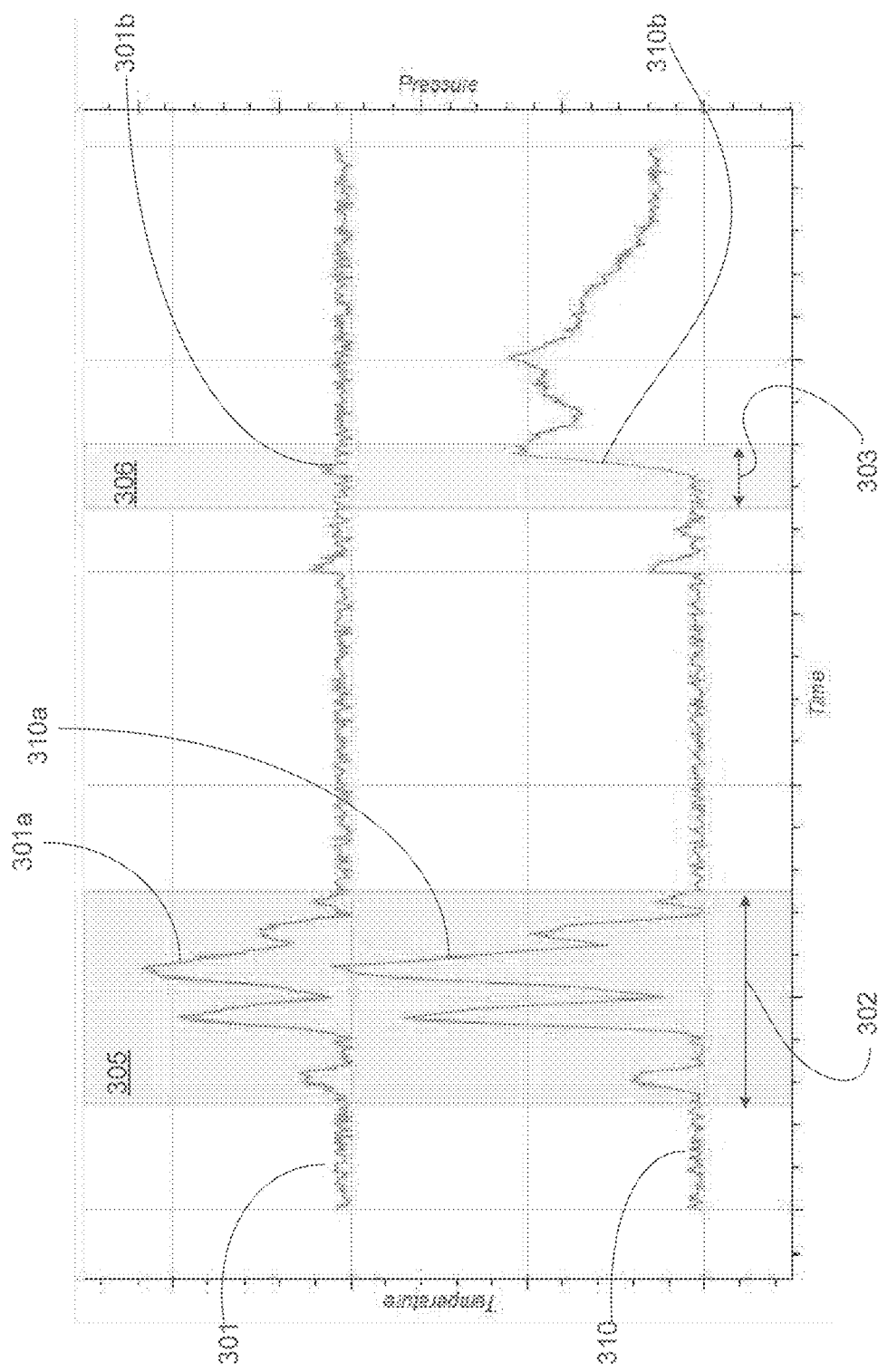
FIG. 3 illustrates, in one example embodiment, variations in barometric pressure with temperature considerations for localizing a mobile device in extreme ambient temperature conditions.

FIG. 3 illustrates, in one example embodiment, variations in barometric pressure with temperature considerations for localizing mobile device 101 in extreme ambient temperature conditions during traversal along a sequence of positions of an indoor facility. It is observed that while barometric ambient pressure measurements by mobile device 101 may generally, and under normal conditions, indicate a height, altitude or floor number of a multi-floor building or similar facility, extreme and anomalous temperature conditions, such as experienced in building or floor engulfed in flames, may generate false or spurious barometric pressure readings. For instance, a higher barometric pressure reading caused by the higher temperatures spuriously indicating that mobile device 101 has transitioned to a lower floor of the building, when in fact no such transition occurred.

In particular, FIG. 3 depicts ambient temperature 301 contemporaneous with ambient barometric pressure 310 while traversing a sequence of positions in a floor of a multi-floor building, in one embodiment. Where the temperature anomaly that includes temperature spike 301a exists over duration of time 302 while traversing a portion of sequence of positions, such as in the presence of a fire or high-temperature flames, a corresponding barometric pressure anomaly over same duration 302 that includes barometric ambient pressure spike 310a may be identified, and spurious barometric pressure region 305 may be identified.

For comparison purposes, normal or nominal region 306 existing over duration of time 303, for instance, may depict ambient pressure increase or spike 310a caused by carried mobile device 101 changing floors within the building, in the case depicting an actual transition to a lower floor, under relatively constant ambient temperature conditions 301b.

Methodology

FIG. 4 illustrates, in an example embodiment, a method of localizing mobile device 101 based on extreme ambient temperature conditions. In describing examples of FIG. 4, reference is made to the examples of FIGS. 1-3 for purposes of illustrating suitable components or elements for performing a step or sub-step being described.

Examples of method steps described herein relate to the use of mobile device 101 for implementing the techniques described. According to one embodiment, the techniques are performed by mobile device localization logic module 105 of mobile device 101 in response to the processor 201 executing one or more sequences of software logic instructions that constitute mobile device localization logic module 105. In embodiments, mobile device localization logic module 105 may include the one or more sequences of instructions within sub-modules including temperature anomaly detection module 210, anomaly confirmation module 211, ambient pressure filtering module 212 and barometric localization module 213. Such instructions may be read into memory 202 from machine-readable medium, such as memory storage devices. In executing the sequences of instructions contained in temperature anomaly detection module 210, anomaly confirmation module 211, ambient pressure filtering module 212 and barometric localization module 213 of mobile device localization logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between the mobile device 101 and remote server computing device 107. For example, the mobile device may collect and transmit data to server 107 that, in turn, performs at least some portion of the techniques described herein.

At step 410, processor 201 executes instructions included in temperature anomaly detection module 210, to detect, using one or more temperature sensors of mobile device 101 operating at a first sampling rate, an ambient temperature anomaly along indoor route 103 being traversed, such as resulting from a building from a fire or high-temperature flames.

In embodiments, mobile device 101 barometric pressure data may include a set of barometric pressure measurements using one or more barometric pressure sensors of mobile device 101 while traversing a sequence of positions along route 103. Route 103 being traversed may be such as a hallway, a corridor, a pedestrian path, a set of stairs or a route commencing from any of an entrance, an exit or a location within or near a given floor of a multi-floor building.

At step 420, processor 201 executes instructions included in anomaly confirmation module 211 to determine, based on switching to a second sampling rate of the temperature sensors of mobile device 101, that the ambient temperature anomaly persists over a sequence of positions along route 103 being traversed. In one embodiment, the ambient temperature sampling rate of temperature sensors of mobile device 101 may be switched to operate at a higher frequency in order to confirm, with better certainty, the persistence of high-temperature flames within a building, for instance.

At step 430, processor 201 executes instructions included in ambient pressure filtering module 212 to filter a set of barometric ambient pressure measurements contemporaneously associated with the sequence of positions along route 103 during traversal, the by mobile device 101, the set of barometric ambient pressure measurements obtained using a barometric pressure sensor of the mobile device 101. In one embodiment, where the temperature anomaly that includes temperature spike 301a exists over duration of time 302, a corresponding or contemporaneous barometric pressure anomaly over same duration 302 that includes barometric ambient pressure spike 310a may be identified. Barometric ambient pressure measurements of mobile device 101 may filter the barometric ambient pressure anomaly. A threshold temperature may be predetermined to define when an extreme condition temperature anomaly exists. For example, when the ambient temperature increases at a rate higher than 3-5 degrees Celsius per minute, in one embodiment.

In one embodiment, the filtering constitutes disregarding ambient barometric pressure changes as sensed by mobile device 101 for duration of time 302, as the latter may falsely indicate a height change or floor change of mobile device 101 when in fact no such change occurred, but rather, the spike in ambient pressure as measured by mobile device 101 resulting from presence and persistence of high-temperature flames or similar extreme ambient temperature anomaly. In this manner of identifying a given temperature anomaly along with its respective duration, barometric ambient pressure measurements contemporaneous with that same duration are identified as spurious, disregarded, and therefore not taken into account in localizing mobile device 101 to a particular floor of a multi-floor building. In one embodiment, the filtering at least partially discards pressure measurements contemporaneous with a duration of the temperature anomaly that exceeds a predetermined threshold temperature for at least a portion of the sequence of positions. In yet another variation, the method may include algorithmically smoothing the filtered set of barometric ambient pressure measurements, minimizing the effects of noise in the barometric pressure measurements, prior to localizing mobile device 101.

In embodiments, the data of repository 108 may be accessible in memory 202 of mobile device 101, and also accessible from server computing device 107 via wireless communication network 106.

At step 440, processor 201 executes further instructions included in barometric localization module 213 to localize mobile device 101 based at least partly on matching the filtered set of barometric ambient pressure measurements with barometric fingerprint data of repository 108 along route 103. In embodiments, the fingerprint map data stored in fingerprint data repository 108 (also referred to herein as repository 108) further associates unique positions along route 103 with any combination of fingerprint data, including gyroscope data, magnetic data, accelerometer data, wireless signal strength data, wireless connectivity data, barometric data, acoustic data, line-of sight data, and ambient lighting data, in addition to barometric pressure fingerprint data stored thereon.

In one embodiment, the localizing identifies a floor number within the multi-floor facility. Erroneous elevation and floor estimation calculations can result in life threatening circumstances for firefighters in a burning building at least partially engulfed in flames. For example, if a firefighter climbed two flights of stairs with a smoke-filled atmosphere and then required assistance, and floor estimation calculations had been performed under an assumption that the firefighter was surrounded by a nominal or normal atmosphere of air when climbing the stairs, the rescue crew would erroneously expect that the firefighter had only climbed one flight of stairs instead of two, for instance. For extreme fire conditions and associated significant changes in temperature and chemical composition of air due to heavy smoke, incremental height or elevation changes may be calculated, in one embodiment, using a generalized hypsometric formula:

$$\Delta h_n = \frac{R_s T_{kelvin}}{g} \ln\left(\frac{P_{n-1}}{P_n}\right)$$

where $T_{kelvin}$ is the instantaneous temperature in Kelvin, g is gravitational acceleration, $P_n$ is the instantaneous pressure, $P_{n-1}$ is a previous-instant pressure measurement, and $R_s$ is the specific gas constant which may be estimated based on the gas sensor ambient readings.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for localizing a mobile device having a processor and a memory, the method comprising:
    detecting, using a temperature sensor of the mobile device at a first sampling rate, an ambient temperature anomaly along an indoor route within an indoor facility being traversed;
    determining, based on switching to a second sampling rate, that the ambient temperature anomaly persists over a sequence of positions along the indoor route;
    filtering a set of barometric ambient pressure measurements contemporaneously associated with the sequence of positions, the set obtained using a barometric pressure sensor of the mobile device; and
    localizing the mobile device based at least partly on the filtered set of barometric ambient pressure measurements.

2. The method of claim 1 wherein the indoor facility is a multi-floor facility, and the indoor route being traversed comprises at least one of a hallway, a corridor, a pedestrian path, a set of stairs and a route commencing from at least an entrance of the indoor facility.

3. The method of claim 2 wherein the localizing identifies a floor number within the multi-floor facility.

4. The method of claim 1 wherein the localizing further comprises matching the filtered set of barometric ambient pressure measurements with barometric fingerprint data of a fingerprint data repository.

5. The method of claim 4 wherein the fingerprint data repository is one of accessible in the memory and accessible from a server computing device via a wireless communication network.

6. The method of claim 4 wherein the fingerprint data repository further includes at least one of wireless signal strength data, wireless connectivity data, accelerometer data, gyroscope data, magnetometer data and ambient lighting sensor data associated with the respective positions along the route.

7. The method of claim 1 wherein the filtering at least partially discards pressure measurements contemporaneous with a duration of the temperature anomaly that exceeds a predetermined threshold temperature for at least a portion of the sequence of positions.

8. The method of claim 1 wherein the second sampling rate comprises a frequency that exceeds the first sampling rate.

9. The method of claim 1 further comprising algorithmically smoothing the filtered set of barometric ambient pressure measurements prior to the localizing.

10. The method of claim 1 wherein the mobile device is one of a wearable computing device, a smartphone, and a wireless communication device.

11. A mobile device comprising:
    a processor;
    a memory storing a set of instructions, the instructions executable in the processor to:
        detect, using a temperature sensor of the mobile device at a first sampling rate, an ambient temperature anomaly along an indoor route being traversed;
        determine, based on switching to a second sampling rate, that the ambient temperature anomaly persists over a sequence of positions along the indoor route;
        filter a set of barometric ambient pressure measurements contemporaneously associated with the sequence of positions, the set obtained using a barometric pressure sensor of the mobile device; and
        localize the mobile device based at least partly on the filtered set of barometric ambient pressure measurements.

12. The mobile device of claim 11 wherein the indoor facility is a multi-floor facility, and the indoor route being traversed comprises at least one of a hallway, a corridor, a pedestrian path, a set of stairs and a route commencing from at least an entrance of the indoor facility.

13. The mobile device of claim 12 wherein the localizing identifies a floor number within the multi-floor facility.

14. The mobile device of claim 11 wherein the localizing further comprises matching the filtered set of barometric ambient pressure measurements with barometric fingerprint data of a fingerprint data repository.

15. The mobile device of claim 14 wherein the fingerprint data repository is one of accessible in the memory and accessible from a server computing device via a wireless communication network.

16. The mobile device of claim 14 wherein the fingerprint data repository further includes at least one of wireless signal strength data, wireless connectivity data, accelerometer data, gyroscope data, magnetometer data and ambient lighting sensor data associated with the respective positions along the route.

17. The mobile device of claim 11 wherein the filtering at least partially discards pressure measurements contemporaneous with a duration of the temperature anomaly that exceeds a predetermined threshold temperature for at least a portion of the sequence of positions.

18. The mobile device of claim 11 wherein the second sampling rate comprises a frequency that exceeds the first sampling rate.

19. The mobile device of claim 11 further comprising instructions executable in the processor to algorithmically smooth the filtered set of barometric ambient pressure measurements prior to the localizing.

20. The mobile device of claim 11 wherein the mobile device is one of a wearable computing device, a smartphone, and a wireless communication device.

* * * * *